Oct. 11, 1966 G. A. SHAFFER, JR 3,277,558
METHOD OF MAKING REED SWITCHES
Filed March 14, 1963 3 Sheets-Sheet 1

INVENTOR.
GEORGE A. SHAFFER, JR.
BY
William A. Zalesak
Attorney

Oct. 11, 1966  G. A. SHAFFER, JR  3,277,558
METHOD OF MAKING REED SWITCHES
Filed March 14, 1963  3 Sheets-Sheet 3

INVENTOR.
GEORGE A. SHAFFER JR.
BY
William A. Zalesak
ATTORNEY

United States Patent Office 3,277,558
Patented Oct. 11, 1966

---

3,277,558
METHOD OF MAKING REED SWITCHES
George A. Shaffer, Jr., Union, N.J., assignor to Radio Corporation of America, a corporation of Delaware
Filed Mar. 14, 1963, Ser. No. 265,130
7 Claims. (Cl. 29—155.5)

This invention relates to a method of making reed switches and particularly to a method of accurately positioning the reeds of such switches with respect to one another during manufacture thereof.

A known type of reed switch comprises a pair of reeds of magnetic material projecting into a tube, usually of glass. The outer ends of the reeds project through and are sealed vacuum tight through opposite end walls of the glass tube to serve as terminals of the switch. Within the glass tube, the two reeds are positioned in overlapped, spaced apart relation.

The reeds are generally thin and resilient, and the switches are operated by applying a magnetic field thereto of a strength sufficient to cause the overlapping portions of the magnetic reeds to contact one another. Proper operation of such switches requires that the reeds contact one another in response to magnetic fields of preselected strengths applied thereto, and that the reeds spring apart on collapse of the fields. Response of the switches in a contacting movement to preselected magnetic field strengths requires, in turn, that the spacing or gap between the reeds be accurate to a very fine degree. In one type of reed switch to which the method of this invention has particular application, for example, the gap between the reeds is controlled to within two ten thousandths of an inch.

It has been found difficult when using prior art methods to produce glass envelope type reed switches having uniformly and accurately spaced apart reeds.

One prior art method, for example, utilizes optical means for measuring the distance between the reeds. One problem associated with this method is that the glass tube or envelope in which the reeds are positioned distorts the view of the reeds. In view of the high order of reed gap accuracy required, even slight distortion interferes with proper gap setting. Furthermore, it is difficult to provide suitable reference points or lines on the reeds, between which the spacing between the reeds may be optically measured. The reason for this is that optical devices having the necessary magnification required to permit measurement and spacing of the reeds within the order of accuracy required, have narrow fields of vision. Unless the edges of the reeds are equally spaced from the viewer, and unless the reeds are positioned edgewise to the viewer, that is, parallel to the line of sight of the viewer, the edges of the reeds will not be in simultaneous focus, and sharply defined edges or reference points will not be discernible. In such case it is extremely difficult for the viewer to determine where the boundary of the out of focus reed is, hence difficult for the viewer to select a suitable reference point or line on the reed from which its distance from the other reed can be measured.

Methods and apparatus have been developed for first or prepositioning the two reeds into fully overlapped and parallel relationship prior to gap setting of the reeds, but such prepositioning of the reeds is a delicate and time-consuming operation using complicated and expensive apparatus.

Therefore, an object of this invention is to provide a novel and inexpensive method of accurately and uniformly setting the gaps between the reeds of reed switches during the manufacture thereof, said method being simple to perform and utilizing inexpensive apparatus.

A further object of this invention is to provide a novel, simple, and extremely accurate method of establishing a reference point between a pair of reeds by means of which the gap between the reeds may be readily and conveniently set, and by means of which great accuracy and uniformity of gap setting may be achieved in the mass production of reed switches.

For achieving these objects, a method is provided which may utilize a pair of chucks adapted to hold the reeds in overlapped relation within an open ended glass tube. The method comprises moving the reeds together and into sufficiently firm contact to provide an electrical contact therebetween, whereby current is caused to pass through the reeds. Thereafter, the reeds are moved apart to a point where the electrical contact between the reeds is first broken, as indicated by the interruption of the current flow therebetween, to provide a reference or indicia point from which measurement may be made. Thereafter, the reeds are further moved apart a preselected accurately measured distance from the reference point.

Advantages of this method are that a reference or datum point from which the spacing between the reeds can be determined is very accurately, readily and simply provided, whereby accurately and uniformly gapped reed switches may be inexpensively made. Further, as will become clear hereinafter, simple and inexpensive apparatus may be utilized in the performance of the method of the invention.

Figures 3, 4:
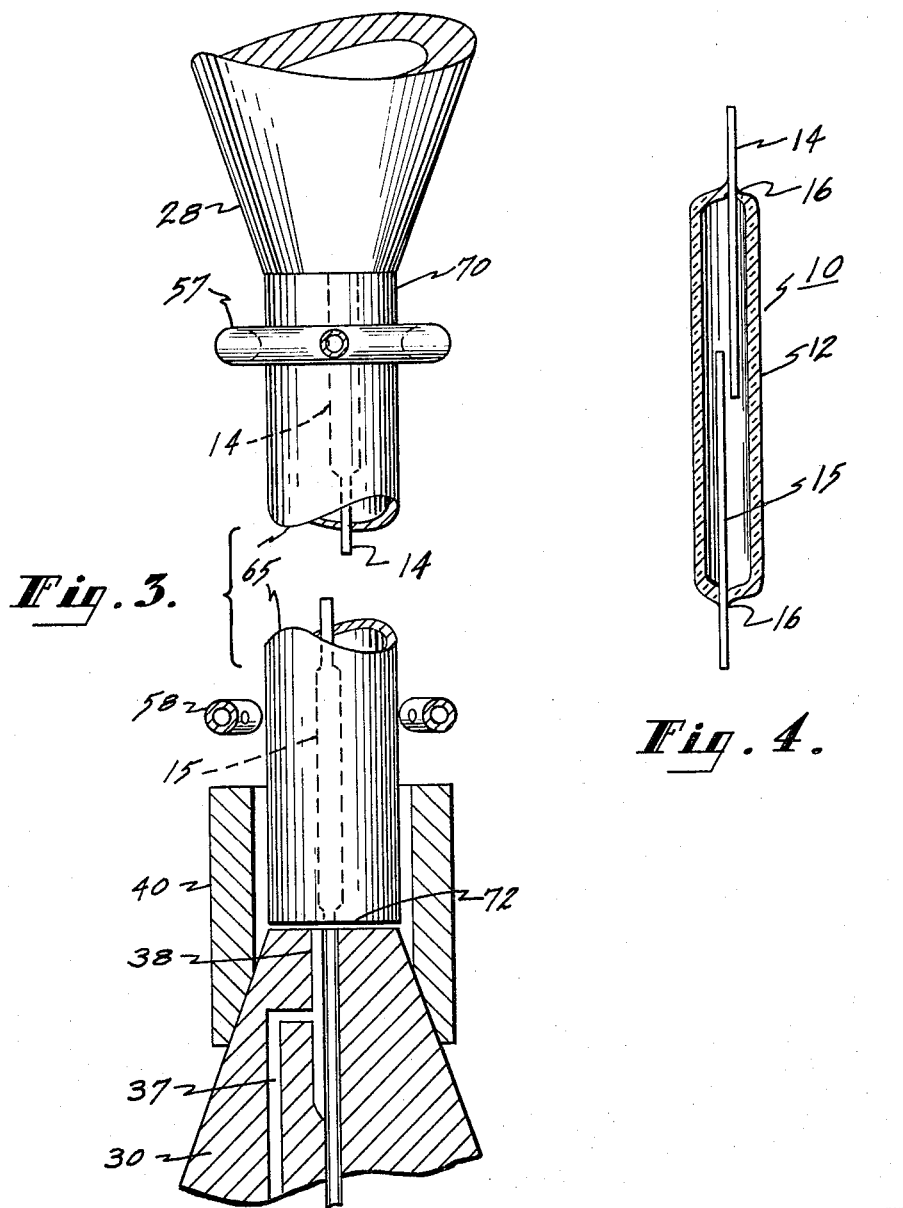
FIG. 3 is an enlarged view of a portion of the apparatus shown in FIG. 1, portions thereof being broken away; and, FIG. 4 is a sectional view of a glass reed switch that may be made by the method of this invention.

Referring first to FIG. 4, a reed switch 10 comprises a glass envelope 12 into which extend a pair of elongated electrical connectors or reeds 14 and 15 made of magnetic material, such as a gold plated nickel-iron alloy. The reeds 14 and 15 extend through glass-to-metal seals 16 at the ends of the envelope 12. The inner ends of the reeds 14 and 15 are close enough together so that a magnetic field of preselected strength when applied to the reed switch 10 by a surrounding coil (not shown) will cause the reeds to contact each other. Within the glass envelope 12 is a protective, non-corrosive atmosphere such as nitrogen or hydrogen, or the like, hydrogen being preferred.

Figure 1:
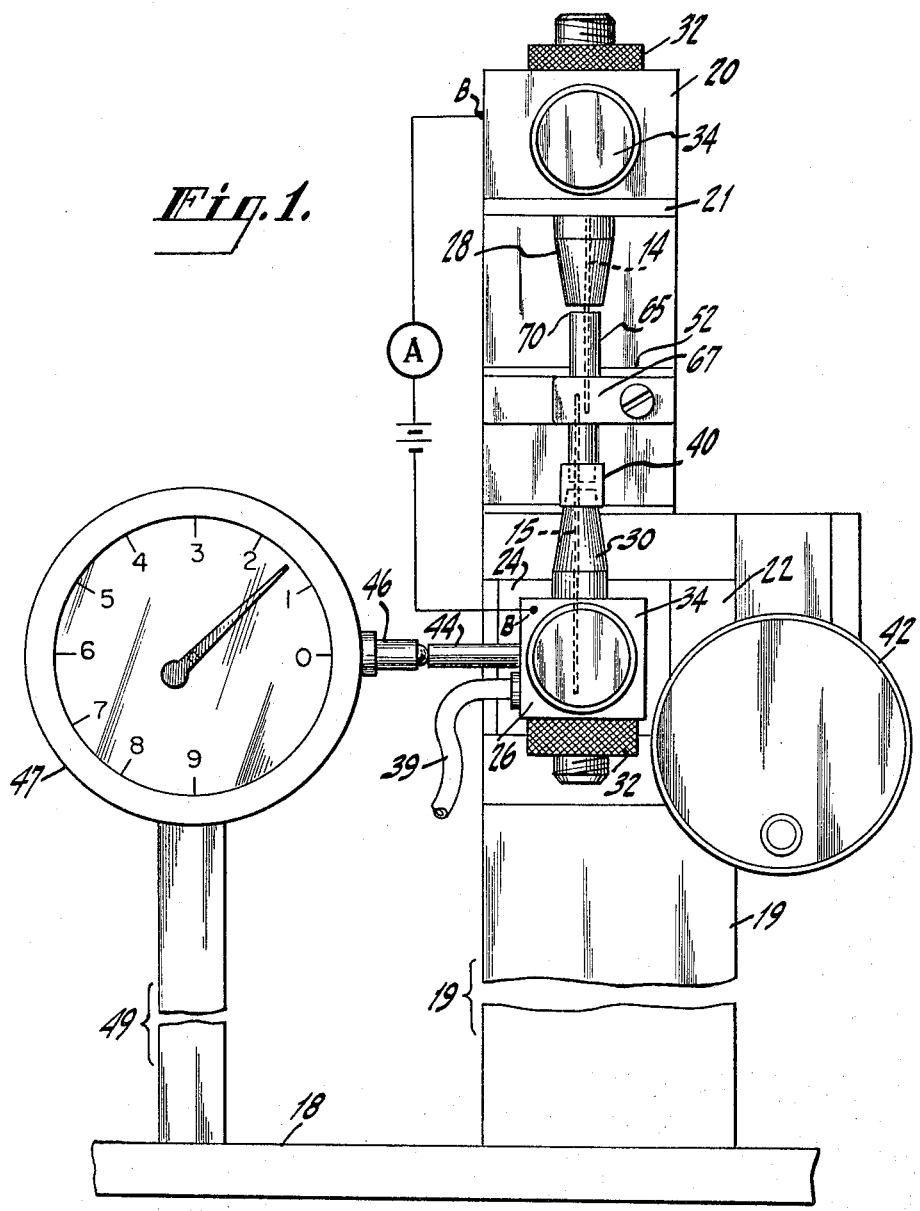
FIG. 1 is a front elevation of apparatus which may be used in the practice of this invention with the reed switch parts mounted on the apparatus but with portions of the apparatus removed for greater clarity.
Figure 2:
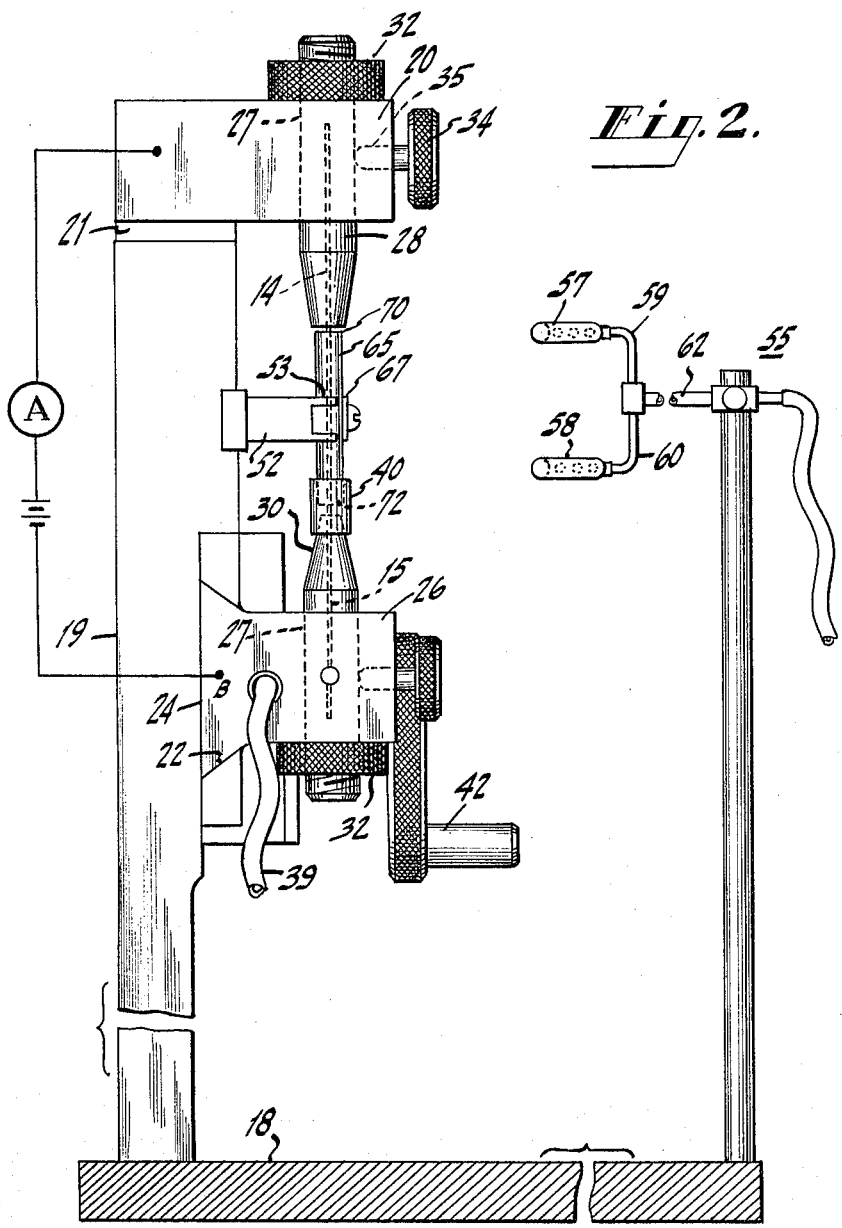
FIG. 2 is a side elevation of the apparatus shown in FIG. 1 with the dial indicator gage shown in FIG. 1 removed for greater clarity.

Apparatus which may be employed for making the reed switches 10 by the method of this invention is shown in FIGS. 1 and 2. A stationary base 18 is provided on which a vertical standard 19 is fixed. An electrically conductive clamp 20 is fixed to vertical standard 19 at the upper portion thereof, an insulating block 21 being provided to electrically insulate clamp 20 from standard 19.

A horizontally extending dovetail groove 22 is formed in the standard 19 below stationary clamp 20. A dovetail slide 24 slidably fits within dovetail groove 22 and includes as a part thereof an electrically conductive clamp 26. Clamps 20 and 26 have vertically extending openings 27 (FIG. 2) therethrough adapted to receive electrically conductive reed chucks 28 and 30. Chucks 28 and 30 have similar openings 38 therein (only one being shown in FIG. 3) adapted to snugly and accurately receive therein external portions of the reeds 14 and 15, respectively. One end of each chuck 28 and 30 is threaded and has a nut 32 thereon. The vertical position of chucks 28 and 30 may thus be controlled with respect to clamps 20 and 26 by means of adjustment of nuts 32. Chucks 28 and 30 are removable from clamps 20 and 26 to facilitate loading of the reeds 14 and 15 therein, and may be clamped securely within clamps 20 and 26 by means of screws 34 threaded into openings 35 in the side of clamps 20 and 26.

Lower chuck 30 (FIG. 3) has a passageway 37 therethrough communicating at one end thereof with the opening 38 in chuck 30, and communicating at its other end with a passageway (not shown) in clamp 26 communicating in turn with a hose 39 (FIGS. 1 and 2) coupled to a source of purging gas (not shown). Mounted on the top end of lower chuck 30 is a tubular shield 40. The purpose of shield 40 will appear hereinafter.

Slide 24, clamp 26 and chuck 30 mounted on clamp 26 are slidable within dovetail groove 22. A crank 42 is provided connected through suitable gearing means (not shown) to effect sliding motion of slide 24 back and forth within dovetail groove 22. A rod 44 (FIG. 1) is mounted on and extends horizontally outwardly from clamp 26. Rod 44 engages plunger 46 of a suitable machinist's dial indicator gage 47 mounted on support 49 fixed to base 18 for accurately indicating the position of clamp 26 within groove 22.

A voltage source indicated by the conventional schematic showing for a battery is connected across clamps 20 and 26 at the points marked "B" (FIG. 1), and an ammeter A, schematically illustrated, is also provided for indicating the flow of current between clamps 20 and 26 when they are electrically connected.

A glass tubing support 52 having a V-shape notch 53 along the edge thereof is mounted on standard 19 between clamps 20 and 26. A burner assembly 55 (FIG. 2) comprising a pair of identical annular burners 57 and 58 are held in parallel spaced position by pipings 59 and 60 which supply gas to the two burners 57 and 58. Support means 62 is provided for moving the assembly 55 to the left, from the position as viewed in FIG. 2, to the position shown in FIG. 3 where the burners 57 and 58 are disposed around a glass tubing 65, and back to the position shown in FIG. 2 where the burners are completely to the right of the clamps 20 and 26 and the glass tubing support 52. Although not shown, burners 57 and 58 may also be moved independently of each other, for a reason to be described. A sector of each annular burner is omitted providing an opening in each burner by means of which the annular burners may be disposed about the glass tubing 65 for sealing the ends thereof.

As shown in FIGS. 1 and 2, the glass tubing 65 is held in the V-notch 53 of support 52 by spring clip 67. The outer ends of reeds 14 and 15 are individually held in chucks 28 and 30, respectively, the chucks being secured within clamps 20 and 26. The inner ends of the reeds overlap within the glass tubing 65 (FIG. 1). The glass tubing 65 is supported in the notch 53 of tubing support 52. The position of the tubing 65 is such that the lower end 72 of the tubing (see FIG. 3) is closely adjacent the upper end of lower chuck 30 and is within shield 40. The upper end 70 of tubing 65 is positioned adjacent the lower end of chuck 28, as shown.

A method of operation of the apparatus described is as follows: at the beginning of the cycle, the burner assembly 55 is positioned to the right as viewed in FIG. 2. Chucks 28 and 30 have been removed from clamps 20 and 26, and reeds 14 and 15 are inserted in the openings 38 therein. Openings 38 are provided with stops therein (not shown) wherein the length of the reeds extending outwardly of chucks 28 and 30 is fixed. Further, the openings 38 are rectangular in cross section so that the rectangularly cross sectioned reeds 14 and 15 are properly angularly oriented with respect to the chucks. The glass tubing 65 is clipped in place on support 52 and held by clip 67. Crank 42 is rotated to cause slide 24 to move to the left, as viewed in FIG. 1, to dispose clamp 26 to the left of and out of registry with clamp 20. Chucks 28 and 30 are then inserted into clamps 20 and 26 through the top and bottom thereof, respectively, and clamped in place by screws 34. Within glass tubing 65, the reeds are disposed in face-to-face, overlapping, and spaced apart relation.

The method of setting the gap between the reeds is as follows: crank 42 is rotated to cause slide 24 to move to the right as viewed in FIG. 1 and in a direction normal to the faces of the reeds until lower reed 15 is moved into electrical contacting relation with upper reed 14. Such contact is indicated by the flow of current through the reeds as indicated by the ammeter A. Since the reeds may have a slight film of dirt or particles of dirt or the like thereon, it is often necessary to move the lower reed 15 into firm contact with upper reed 14 to press the reeds tightly together to provide such electrical contact. Sometimes the resilient reeds are visibly bowed before electrical contact is established.

Thereafter, crank 42 is rotated in the opposite direction to move lower reed 15 in a direction away from upper reed 14 and to a point where the electrical contact between the reeds is first broken, as indicated by the interruption of current flow therebetween. As the operator rotates crank 42, he watches the ammeter and ceases rotating the crank and moving the reed 15 on current interruption. At this point, the reeds are generally also out of physical contact with one another since the passage of current between the reeds, it is believed, cleans the surfaces of the reeds so that a pressure contact therebetween is no longer needed to provide electrical contact between the reeds.

The point where the electrical contact between the reeds is first broken is thereafter used as a reference point from which the gap between the reeds is set, as will be described. Tests made for purposes of evaluation and comparison have revealed that this reference point usually cannot be determined optically. That is, the point where it appeared in the tests (using optical means) that the reeds were first out of contact, was generally not the same point where the reeds were first out of electrical contact as indicated by the interruption of current flow therethrough. Also, the reference point is ordinarily at a different reading on the indicator dial 47 from the making of one switch to another. In this sense, each switch is custom made, the position of the reference point being dependent upon the particular dimensions and physical properties of the particular pair of reeds being spaced.

The location of the reference point, that is, the position of slide 24 within dovetail groove 22, is accurately shown by indicator dial 47 and is now noted by the operator. Thereafter crank 42 is further rotated to move lower reed 15 away from the reference point and away from upper reed 14 a selected distance for setting the correct gap between the reeds. This latter movement is accurately measured by the operator by adding (or subtracting) the selected distance to the reading on the indicator dial 47 to derive a target reading. Then the operator continues the crank rotation until the target reading is reached. As known, movements as small as one ten-thousandth of an inch are readily and clearly shown on such dials, whereby great accuracy may be achieved and operator fatigue reduced.

Prior to sealing, the purging gas is supplied through hose 39, through opening 38 in chuck 30 and through glass tube 65 for purging the atmospheric gases from tube 65. Now that the gap between the reeds has been set, the ends of the glass tube 65 are to be sealed about the ends of the reeds passing therethrough. The burner assembly 55 is then moved to the left, as viewed in FIG. 2, until the ends of the tube 65 are centered in the individual burners 57 and 58, as shown in FIG. 3. Top burner 57 has a hotter flame than lower burner 58 and the top end 70 of the glass tube 65 is sealed about the upper reed 14 extending therethrough prior to the sealing of the lower end 72 about lower reed 15. In this manner, the upwardly flowing purge gas is trapped within glass tubing 65. When the upper seal is completed, top burner 57 is moved away from tubing 65. Thereafter the lower seal is made, completing the reed switch which is then removed from the apparatus by withdrawing chucks 28 and 30 and unclipping tubing 65 from clip 67.

As shown in FIG. 3, lower burner 58 heats a portion of tubing 65 at a position spaced from the lower end 72 thereof that is received within shield 40. Shield 40 prevents the products of combustion from burner 58 from entering the reed switch through the lower end 72. It has been found that if such products of combustion enter the reed switch and are sealed therein the operating characteristics of the reed switch may be adversely affected.

What is claimed is:

1. In a method of fabricating a reed switch, the steps comprising:
    (a) positioning a pair of conductive reeds in electrical contact,
    (b) completing an electrical circuit through said reeds,
    (c) moving said reeds apart until the circuit is first broken to position said reeds apart at an indicia position,
    (d) moving said reeds a selected distance relative to each other from said indicia position, whereby a selected spacing is achieved for said reeds, and
    (e) then fixing said reeds at said selected spacing.

2. In a method of fabricating a reed switch, the steps comprising:
    (a) positioning a pair of conductive reeds in spaced apart relation,
    (b) moving one of said reeds into electrical contact with the other of said reeds,
    (c) completing an electrical circuit through said reeds,
    (d) moving said reeds apart until the circuit is first broken to position said reeds apart at a reference position,
    (e) moving said reeds a selected distance relative to each other from said reference position, whereby a selected spacing is achieved for said reeds, and
    (f) then fixing said reeds at said selected spacing.

3. Method of fabricating a reed switch comprising:
    (a) positioning a pair of conductive reeds in spaced apart relation within an open ended glass tubing, with portions of said reeds extending outwardly through the open ends of said tubing,
    (b) moving said reeds into electrical contact,
    (c) completing an electrical circuit through said reeds,
    (d) moving said reeds apart until the circuit is first broken to position said reeds apart at an indicia position,
    (e) then moving said reeds a selected distance relative to each other away from said indicia position, whereby a selected spacing is achieved for said reeds,
    (f) passing a purging gas through said open ended tubing, and
    (g) then sealing the ends of said tubing onto the reeds passing therethrough for trapping the purging gas within said tubing and for fixing the selected spacing of said reeds.

4. In a method of fabricating a reed switch, the steps comprising:
    (a) positioning a pair of conductive reeds in overlapping position,
    (b) providing a voltage source across said reeds,
    (c) moving one of said reeds in a direction to bring said one reed into electrical contact with the other of said reeds, whereby current is caused to flow through the contacting reeds,
    (d) thereafter moving said one reed in a direction opposite said direction until the electrical contacting relation between said reeds is first broken,
    (e) further moving said one reed in said opposite direction a predetermined distance from the point where said electrical contact between said reeds is first broken, and
    (f) then fixing said one reed at said predetermined distance from said point.

5. In a method of fabricating a reed switch, the steps comprising:
    (a) positioning a pair of conductive reeds in face-to-face overlapping position,
    (b) providing a voltage source across said reeds,
    (c) moving one of said reeds in a direction transverse to the longitudinal axis of said reeds and into electrical contact with the other of said reeds, whereby current is caused to flow through the contacting reeds,
    (d) thereafter moving said one reed in a direction opposite said direction until the electrical contact between said reeds is first broken,
    (e) further moving said one reed in said opposite direction a predetermined accurately measured distance from the point where said electrical contact between said reeds is first broken, and
    (f) then fixing said one reed at said predetermined distance from said point.

6. In a method of fabricating a reed switch, the steps comprising:
    (a) rigidly supporting a pair of reeds in support means movable with respect to each other,
    (b) moving said support means to position said reeds in face-to-face overlapping position,
    (c) moving one of said support means in a direction normal to the faces of said reeds to bring the reed supported thereby into electrical contact with the other of said reeds, whereby current is caused to flow through the contacting reeds,
    (d) moving said one support means in a direction opposite said normal direction until the electrical contact between said reeds is first broken,
    (e) thereafter continuing to move said one support means in said opposite direction a predetermined distance from the point where said electrical contact between said reeds is first broken, and
    (f) then fixing said one support at said predetermined distance.

7. Method of fabricating a reed switch comprising:
    (a) positioning a pair of conductive reeds in spaced apart and overlapped relation within an open ended glass tubing, with portions of said reeds extending outwardly through the open ends of said tubing,
    (b) moving one of said reeds in a direction transverse of its length and into electrical contact with the other of said reeds,
    (c) completing an electrical circuit through said reeds,
    (d) moving said one reed in a direction opposite said direction until the circuit is broken to position said reeds apart at an indicia position,
    (e) then further moving said one reed in said opposite direction a selected distance away from said indicia position whereby a selected spacing is achieved for said reeds,
    (f) passing a purging gas through said open ended tubing, and
    (g) sealing the ends of said tubing onto the reeds passing therethrough for trapping the purging gas within said tubing and for fixing the selected spacing of said reeds.

References Cited by the Examiner

UNITED STATES PATENTS

| | | | |
|---|---|---|---|
| 2,605,378 | 7/1952 | Carpenter | 324—28 |
| 2,648,167 | 8/1953 | Ellwood | 200—87 |
| 2,792,474 | 5/1957 | Dales. | |
| 2,855,017 | 10/1958 | Pollard | 200—87 X |
| 2,882,648 | 4/1959 | Horgoard et al. | 65—32 |
| 2,900,771 | 8/1959 | Levand | 316—17 X |

FOREIGN PATENTS 132,581   5/1949   Australia.

JOHN F. CAMPBELL, *Primary Examiner.*

WHITMORE A. WILTZ, *Examiner.*

R. W. CHURCH, *Assistant Examiner.*